United States Patent [19]

Foster

[11] 4,043,787

[45] Aug. 23, 1977

[54] CYLINDER AND PISTON ASSEMBLIES IN GLASSWARE FORMING APPARATUS

[75] Inventor: Thomas Vincent Foster, Doncaster, England

[73] Assignee: Emhart Industries, Inc., Farmington, Conn.

[21] Appl. No.: 696,336

[22] Filed: June 15, 1976

[30] Foreign Application Priority Data

June 19, 1975 United Kingdom ............... 26114/75

[51] Int. Cl.$^2$ ............................................... C03B 9/40

[52] U.S. Cl. ........................................ 65/227; 65/229; 91/408; 92/9

[58] Field of Search ................... 65/227, 229; 92/8, 9; 91/407, 408

[56] References Cited

U.S. PATENT DOCUMENTS

| | | | |
|---|---|---|---|
| 2,768,611 | 10/1956 | Anderson | 91/407 X |
| 2,870,744 | 1/1959 | Hallerstrom | 91/407 X |
| 3,914,120 | 10/1975 | Foster | 65/229 |

*Primary Examiner*—Arthur D. Kellogg

*Attorney, Agent, or Firm*—H. Samuel Kieser

[57] ABSTRACT

In glassware forming apparatus the reciprocation of a transfer carriage between two operating positions is effected by a cylinder and piston device in which the traverse of the piston is progressively cushioned at the ends of the piston stroke. Members, which are slidably mounted in the piston and protrude from it, close exhaust outlets in an end wall of the cylinder when the piston is at different predetermined distances from the end wall, and these members are positioned in the piston by the action of the end wall for similarly co-operating with corresponding exhaust outlets in the opposite end wall of the cylinder.

12 Claims, 4 Drawing Figures

CYLINDER AND PISTON ASSEMBLIES IN GLASSWARE FORMING APPARATUS

BACKGROUND OF THE INVENTION

In glassware forming apparatus it is common for a mechanical part to be reciprocated between two positions using a cylinder and piston assembly to effect the reciprocation. Such reciprocation is frequently effected speedily using a high pressure system to move the piston rapidly from one end of the cylinder to the other and in these circumstances a problem arises in the cushioning the impact of the piston at each end of the cylinder. Unless some means is provided for damping the movement of the piston as it approaches the end of the cylinder, the piston will have a high velocity when it contacts the end of the cylinder. Repeated high velocity impacts between the piston and the ends of the cylinder are clearly undesirable since they are likely to lead to damage, either of the cylinder and piston assembly itself or of apparatus or mechanisms connected for operation by the cylinder and piston assembly.

SUMMARY OF THE INVENTION

According to the present invention there is provided a glassware forming apparatus including a mechanism which is movable between first and second positions during the formation of glassware in the apparatus, and a cylinder and piston assembly for moving the mechanism between the first and second positions, the cylinder and piston assembly comprising a cylinder having opposed end walls, a piston slidably mounted in the cylinder for reciprocation between the end walls of the cylinder, exhaust openings in the opposed end walls of the cylinder and means slidably carried by the piston for co-operating with an exhaust opening in one end wall of the cylinder to produce a cushioning effect when the piston is a predetermined distance from the end of the piston stroke in a first direction, said means being repositionable in the piston by the said one end wall at the end of the piston stroke in the said first direction such that the said means will co-operate with an exhaust opening in the other end wall of the cylinder to produce a similar cushioning effect when the piston is a similar predetermined distance from the end of the piston stroke in the reverse direction and being further re-positionable in the piston by the other end wall for further co-operation with the said open end wall to produce the cushioning effect when the piston is the said predetermined distance from the end of the next piston stroke in the said first direction.

Although a cylinder and piston assembly which is used in glassware forming apparatus in accordance with the present invention may be provided with a single means slidably carried by the piston, the cylinder and piston assembly preferably includes a plurality of means slidably carried by the piston for co-operating with exhaust openings in the end walls of the cylinder at a plurality of different predetermined distances from the ends of the piston strokes to produce a progressively increasing cushioning effect. All the means comprising the plurality of means are re-positionable in the piston at the end of each piston stroke for the production of a similar progressively increasing cushioning effect in the piston stroke in the opposite direction.

The cylinder and piston assembly may include three or more means slidably carried by the piston. However, the preferred embodiment of the invention which will be described includes a pair of means slidably carried by the piston, wherein the second means is slidably carried by the piston for co-operating with a second exhaust opening in the said one end wall of the cylinder to enhance the cushioning effect when the piston is a second predetermined distance from the end of the piston stroke in the first direction, the second predetermined distance being less than the said predetermined distance, and the second means is re-positionable in the piston by the said one end wall at the end of the piston stroke in the said first direction, such that the second means will co-operate with a second exhaust opening in the said other end wall of the cylinder to enhance the cushioning effect when the piston is at the second predetermined distance from the end of the piston stroke in the reverse direction.

The exhaust opening in the respective end walls of the cylinder advantageously correspond to one another both in position and size, there being a greater number of exhaust openings than there are slidable means for co-operating with the exhaust openings, and the slidable means being members of different lengths whereby, during reciprocation of the piston, the members are effective to produce a progressive cushioning effect by closure of the corresponding exhaust openings when the piston reaches predetermined distances from the ends of the piston stroke.

In the simplest case, one more exhaust opening is provided in each of the opposed end walls than there are slidable members. In order to obtain the maximum possible cushioning effect, the exhaust opening which is not closed by a slidable member is the smallest exhaust opening. Preferably ducting leading from the smallest exhaust opening includes variable restrictor means.

Advantageously the exhaust openings which are closed by slidable members are of different sizes, the exhaust openings being closed in the order of decreasing size of the exhaust openings. Ductings leading from all the exhaust openings may include variable restrictor means whereby the rates of flow of exhaust fluid through the respective exhaust openings may be varied. However, that opening which is closed first by one of the members as the piston approaches an end wall of the cylinder may be such as to provide a substantially unrestricted flow of exhaust fluid from the cylinder so that the initial stages of movement of the piston from one end wall of the cylinder to the other are substantially unimpeded by exhaust fluid.

Preferably there are three exhaust openings in each of the opposed end walls of the cylinder and two members slidably carried by the piston. Each of the members extends through an aperture in the piston and has an axial length greater than the length of the aperture. Each member comprises a shaft slidably received within the aperture and a pair of enlarged end portions on the shaft which retain the member in the aperture and which slide into recesses at the ends of the aperture to enable the piston to contact the end walls of the cylinder at its extremes of movement in the cylinder. The enlarged end portion of the member substantially closes an opening in the corresponding end wall of the cylinder.

The cylinder and piston assembly may be provided with a single member extending through an aperture in the piston. When the piston is caused to slide within the cylinder, as the piston nears an end wall of the cylinder and the enlarged end portion of the member covers its associated exhaust opening the reduction in the rate of flow of the exhaust fluid from between the piston and the end of the cylinder causes the piston to experience a cushioning or buffer effect. By providing more than one member in the cylinder and piston assembly in accordance with the present invention such that the members cover their associated exhaust openings at different stages in the movement of the piston from one end wall of the cylinder to the other end wall of cylinder, a stepwise reduction in the rate of flow of the exhaust fluid from between the piston and the other end of the cylinder is obtained giving rise to a cushioning effect which increases towards the end of the travel of the piston. The provision of a pair of members has been found to be particularly advantageous.

BRIEF DESCRIPTION OF THE DRAWINGS

In the drawings, the same or similar parts are designated by like reference numerals.

DETAILED DESCRIPTION

Figure 1:
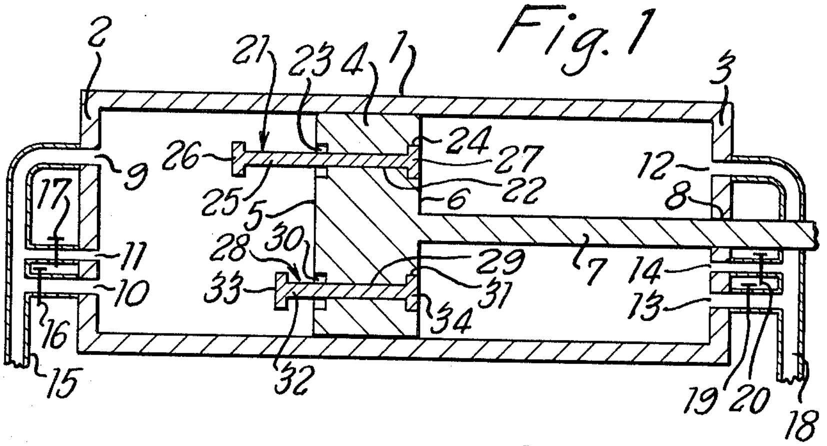
FIG. 1 is a longitudinal cross-section of a cylinder and piston assembly showing the piston moving towards one end of the cylinder.

The cylinder and piston assembly which will be described with reference to FIGS. 1 to 3 of the accompanying drawings is designed for effecting transfer of a carriage which operates on a straight line reciprocating motion to move a parison from a first forming station of a glassware forming machine to a second station for further forming. The carriage simultaneously moves a further formed parison from the second station to a third or final forming station, and an article of glassware from the final station out of the glassware forming apparatus. The use of the cylinder and piston device in this glassware forming apparatus will be further explained below with reference to FIG. 4.

Referring to the drawings, the cylinder and piston assembly includes a cylinder 1 having opposed end walls 2 and 3. A piston 4 having substantially flat end faces 5 and 6 is slidably mounted in the cylinder 1 for reciprocation between the end walls 2 and 3. The piston 4 is mounted on one end of a shaft 7 which passes out through an aperture 8 in the end wall 3 and is connected for operation of a reciprocable device which is part of the glassware forming machine. The aperture 8 is provided with a known type of seal (not shown) in order to reduce as much as possible any leakage of fluid out from the cylinder 1 between the shaft 7 and the aperture 8.

The end walls 2 and 3 are both provided with a plurality of exhaust openings. The exhaust openings in the end wall 2 comprise a first opening 9, a second, restricted opening 10 and a restricted exhaust outlet 11. The end wall 3 is similarly provided with a first opening 12, a second, restricted opening 13 and a restricted exhaust outlet 14. The first and second openings 9 and 10 and the restricted exhaust outlet 11 are connected together by ducting in the form of a manifold 15 which is connected to valve means (not shown) for alternatively connecting the manifold 15 to a fluid supply and to exhaust. Variable restrictor means 16 and 17 are provided in those parts of the manifold 15 which lead from the second opening 10 and the restricted exhaust outlet 11. Variable restrictor means may also be provided in that part of the manifold 15 which leads from the first opening 9, if desired.

The first opening 12, the second opening 13 and the restricted exhaust outlet 14 in the end wall 3 are connected together by ducting in the form of a manifold 18 which is connected to valve means (not shown) for alternatively connecting the manifold 18 to a fluid supply and to exhaust. Variable restrictor means 19 and 20 are provided in those parts of the manifold 18 which lead from the second opening 13 and the restricted exhaust outlet 14. Variable restrictor means may also be provided in that part of the manifold 18 which leads from the first opening 12.

Means slidably carried by the piston 4 for co-operating with the first exhaust opening 9 in the end wall 2 and the first exhaust opening 12 in the end wall 3 is provided by a first member 21. The first member 21 extends through an aperture 22 which extends through the piston 4 between the end faces 5 and 6. Recesses 23 and 24 are provided at each end of the aperture 22.

The first member 21 has an axial length greater than the length of the aperture 22 and comprises a shaft 25 which is slidably received within the aperture 22 and a pair of enlarged end portions 26 and 27 on the shaft 25. The enlarged end portions 26 and 27 retain the first member 21 in the aperture 22 and slide into the recesses 23 and 24 at the ends of the aperture 22 to enable the piston 4 to contact the end walls 2 and 3 of the cylinder 1 at the extremes of movement of the piston 4 in the cylinder 1. The first opening 9 is capable of being substantially closed by the enlarged end portion 26 and the first opening 12 is capable of being substantially closed by the enlarged end portion 27.

A second means is slidably carried by the piston 4 for co-operating with the second exhaust openings 10 and 13 in the end walls 2 and 3 of the cylinder 1. This second means takes the form of a second member 28 which extends through a second aperture 29 which extends through the piston 4 between the end faces 5 and 6. Recesses 30 and 31 are provided at each end of the second aperture 29. The second member 28 has an axial length greater than the length of the second aperture 29 but less than the length of the first member 21. The second member 28 comprises a shaft 32 which is slidably received in the second aperture 29 and a pair of enlarged end portions 33 and 34 on the shaft 32 which serve to retain the second member 28 in the second aperture 29 and which slide into the respective recesses 30 and 31 to enable the end faces 5 and 6 of the piston to contact the end walls 2 and 3 of the cylinder 1. The second restricted openings 10 and 13 in the end walls 2 and 3 are capable of being substantially closed by the enlarged end portions 33 and 34 of the second member 38.

In operation of the cylinder and piston assembly, the piston 4 is moved from one end to the other end of the cylinder 1 by the application of fluid pressure through one of the manifolds 15 and 18 while the other of the manifolds 15 and 18 is connected to exhaust. When the piston 4 is to be moved from the end wall 3 of the cylinder 1 to the end wall 2, before the movement is commenced the end face 6 of the piston 4 will lie substantially flush with the end wall 3 of the cylinder 1, and the end portions 27 and 34 of the first and second members 21 and 28 will lie wholly within their respective recesses 24 and 31. The manifold 18 is connected to a fluid supply, for example an air supply, and the manifold 15 is connected to exhaust. The pressure of the fluid in the manifold 18 causes the piston 4 to move towards the end wall 2 of the cylinder 1.

The initial stages of the movement of the piston 4 will be rapid. The first and second exhaust openings 9 and 10 and the exhaust outlet 11 are all open and allow sufficient exhaust flow of fluid to prevent significant build-up of fluid pressure between the end face 5 of the piston 4 and the end wall 2 of the cylinder 1. As the piston 4 nears the end wall 2, the enlarged end portion of the first member 21 contacts the end wall 2 and covers the first opening 9 as shown in FIG. 2. Exhaust fluid can only flow through the second, restricted opening 10 and the restricted exhaust outlet 11 and there is a build-up of fluid pressure between the end wall 2 and the end face 5. The build-up of fluid pressure causes a reduction in the velocity of the piston 4, which is experienced as a cushioning effect. While the piston 4 continues to move towards the end wall 2 the first member 21 is held stationary relative to the cylinder 1 by the end wall 2 and the shaft 25 slides within the aperture 22.

Figure 3:
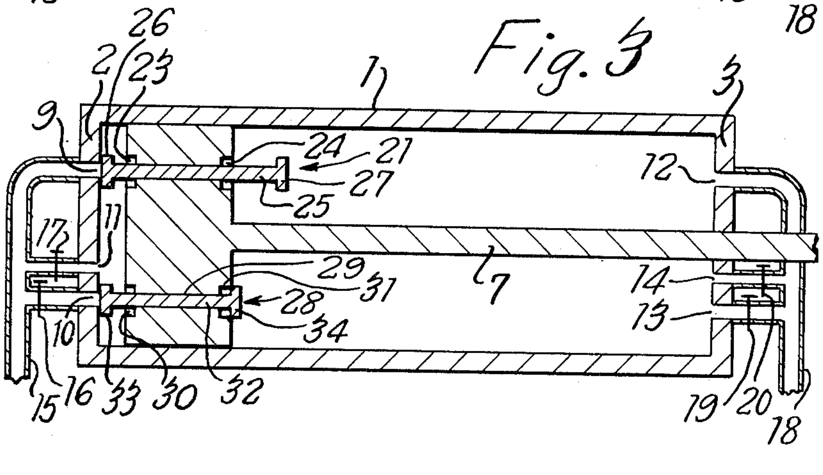
FIG. 3 shows the cylinder and piston assembly of FIGS. 1 and 2 at a still later stage of the movement of the piston.

As the piston 4 moves still closer to the end wall 2 the enlarged end portion 23 of the second member 28 contacts the end wall 2 and covers the second, restricted opening 10 as shown in FIG. 3. Since only the restricted exhaust outlet 11 remains uncovered an increased build-up of pressure between the end face 5 and the end wall 2 occurs as the piston 4 moves towards the end wall 2. The increased build-up of pressure effects a further reduction in the velocity of the piston 4 which is experienced as an enhanced cushioning effect. The piston 4 continues to move toward the end wall 2 and since the first and second members 21 and 28 are both held stationary relative to the cylinder 1 by the end wall 2, the shafts 25 and 32 both slide within their respective apertures 22 and 29.

At the end of the movement of the piston 4 towards the end wall 2, the end face 5 will lie substantially flush with the end wall 2 and the first and second members 21 and 28 will be positioned for co-operation with the first and second openings 12 and 13 in the course of return movement of the piston 4 from the end wall 2 to the end wall 3 of the cylinder 1. The return movement is effected by disconnecting the manifold 18 from the fluid supply and connecting it to exhaust and disconnecting the manifold 15 from exhaust and connecting it to a fluid supply.

The return movement of the piston 4 from the end wall 2 to the end wall 3 will be similar to the movement of the piston 4 from the end wall 3 to the end wall 2. The enlarged end portions 27 and 34 of the first and second members 21 and 28 contact the end wall 3 to cooperate with the first and second openings 12 and 13 at the same distances as the distances at which the enlarged end portions 26 and 33 contact the end wall 2, to provide the cushioning effect and enhanced cushioning effect.

At the end of the movement of the piston 4 from the end wall 2 to the end wall 3 the first and second members 21 and 28 will be re-positioned in the piston 4 for co-operation with the first and second openings 9 and 10 in the next movement of the piston 4 from the end wall 2 to the end wall 3.

It will be appreciated that the cushioning effects provided by the first and second members 21 and 28 can be varied by suitable adjustment of the variable restrictor means 16, 17, 19 and 20.

It is important that the piston 4 should be prevented from rotating within the cylinder 1 since any rotation of the piston 4 would bring the first and second members 21 and 28 out of alignment with the openings 9, 10, 12 and 13 in the end walls 2 and 3. The piston 4 may be prevented from rotating within the cylinder 1, for example, by making the cylinder 1 non-circular in cross-section, or by providing a suitable key-way in the surface of the cylinder 1 for co-operation with a key on the piston 4. Alternatively, the piston 4 may be prevented from rotating within the cylinder 1 by having the shaft 7 rigidly connected both to the piston 4 and to the device which is actuated by the movement of the shaft 7.

It is preferred for the first and second members 21 and 28 to slide sufficiently easily within the first and second apertures 22 and 29 for the first and second members 21 and 28 to be movable under the action of fluid pressure alone so that the enlarged end portions on the side of the piston 4 at which fluid pressure is present are moved within their respective recesses if fluid pressure is applied when the piston 4 is at a position intermediate the end walls 2 and 3. In this way the cushioning effects are still experienced by the piston 4 if an initial application of fluid pressure on one side of the piston 4 should occur when the piston 4 is at a position intermediate the end walls 2 and 3 of the cylinder 1.

The end wall 3 is preferably releasably secured to the body of the cylinder 1, in order to provide access to the interior of the cylinder 1 and to facilitate removal of the piston 4. The first and second members 21 and 28 may each be removed from the piston 4 so that members of different lengths may be used in their places in order to obtain cushioning effects which commence at different distances from the end walls 2 and 3 from the cushioning effects provided by the first and second members 21 and 28.

The first and second members 21 and 28 may be removable either by having at least one of the enlarged end portions removable from the shaft (for example, the enlarged end portion 26 may be threadedly mounted on the shaft 25) or by having the shaft in two parts which may connect to one another by a screw or bayonet fitting. Alternatively, the piston 4 could be separable into two parts substantially along a plane which is perpendicular to the end faces 5 and 6 such that each half of the piston 4 contains a half of each of the first and second apertures 22 and 29. If the piston 4 were separable in this way, the first and second members would be removable without any need for one of the enlarged end portions to be separable from the shaft or for the shaft to be in two parts.

Figure 2:
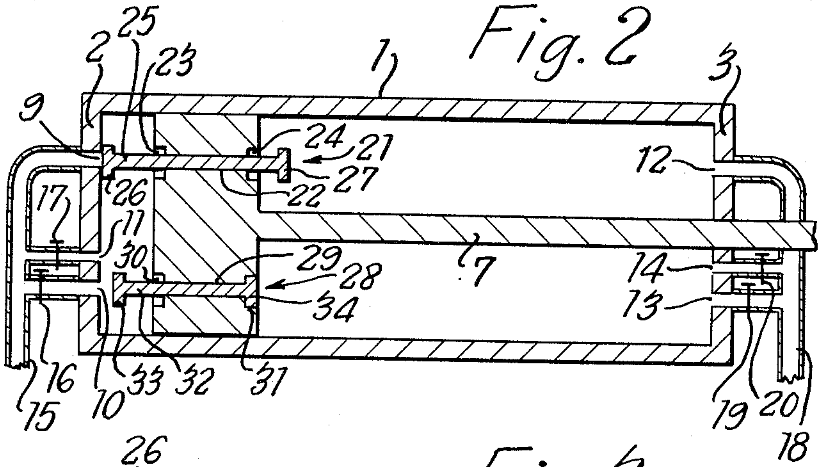
FIG. 2 shows the cylinder and piston assembly of FIG. 1 at a later stage of movement of the piston.

The preferred embodiment of the present invention which has been described with reference to FIGS. 1 to 3 is provided with first and second slidable members which are carried by the piston. However, it will be appreciated that a greater number of slidable members may be carried by the piston, each of the slidable members being of a different length so that a progressively increasing cushioning effect is produced at a plurality of different predetermined distances from the ends of the piston strokes.

The cylinder and piston assembly of FIGS. 1 to 3 has the advantages that it is a simple and reliable assembly in which a cushioning effect is provided at extremes of movement of the piston. The cushioning effect is provided without the need for inclusion of any springs within the piston since when the piston is at one extreme of its movement within the cylinder the first and second members are already positioned for cushioning at the opposite end of the cylinder.

Figure 4:
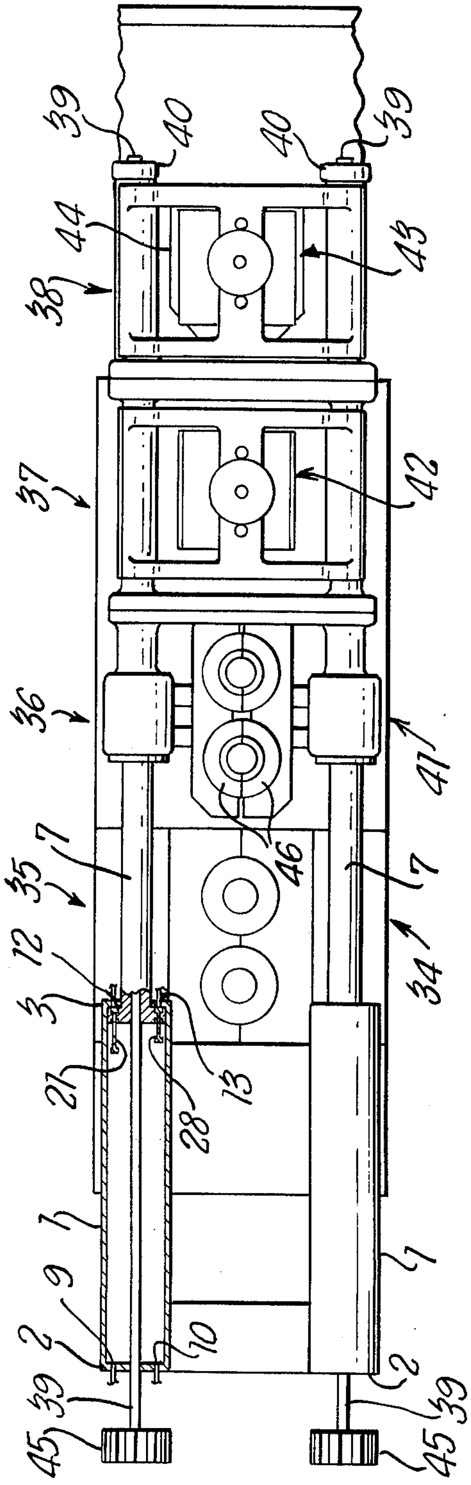
FIG. 4 is a plan view of part of a glassware forming apparatus showing a horizontally movable carriage for transferring parisons and formed glassware articles with one of the reciprocable fluid motors shown in cross-section.

FIG. 4 of the drawings is a plan view of part of an individual section of a glassware forming machine. The individual section includes a section frame 34 within which are a first forming station 35, an intermediate forming station 36 and a final forming station 37. A transfer mechanism in the individual section of the glassware forming machine includes a carriage 38 which is supported on a pair of horizontal guide rods 39, 39 which extend longitudinally of the section frame 34 across the stations 35, 36 and 37. The guide rods 39, 39 are supported at one end by a bracket 40 and at the other end by the end walls 2 of the cylinders of the pair of cylinder and piston assemblies as illustrated in FIGS. 1 to 3. The carriage 38 is connected to the shafts 7 of the pair of cylinder and piston assemblies for reciprocation upon the guide rods 20 between extended and retracted positions.

The carriage 38 supports a neck ring mechanism 41 and combined blow head and tong mechanisms 42 and 43. In the retracted position of the carriage 38, the neck ring mechanism 41 is supported over the first forming station 35, the combined blow head and tong mechanism 42 is supported over the intermediate forming station 36 and the combined blow head and tong mechanism 43 is supported over the final forming station 37. In the extended position of the carriage 38, the neck ring mechanism 41 is supported over the intermediate forming station 36, the combined blow head and tong mechanism 42 is supported over the final forming station 37 and the combined blow head and tong mechanism 43 is supported over a deadplate 44.

The horizontal guide rods 39, 39 are arranged for rotation by means of gears 45 by a suitable motor or motors. The neck ring mechanism 41 includes a pair of neck ring moulds 46 which are coupled to the guide rods 39, 39 by rack and pinion means such that the neck ring moulds 46 may be separated and closed by suitable rotation of the guide rods 39, 39.

The carriage 38 is moved between its extended and retracted positions by movement of the pistons 4 within the cylinders 1. The movements of the pistons 4 are cushioned in the manner described with reference to FIGS. 1 to 3 of the drawings. During the movement of the carriage 38 to the extended position, a parison formed at the first forming station 35 is moved to the intermediate forming station 36, a further formed piston is moved from the intermediate forming station 36 to the final forming station 37, and a fully formed glass article is moved from the final forming station 37 to the deadplate 44.

The moved articles are released from the neck ring mechanism 41 and the tong mechanisms 42 and 43 in the extended position of the carriage 38 which is then returned to its retracted position for forming of the next parison using the neck ring mechanism 41.

The glassware forming apparatus which is described and which incorporates the cylinder and piston assembly illustrated in FIGS. 1 to 3 provides an efficient cushioning effect which enables the carriage 38 to be extended and retracted at high speed so that the time taken in the movement of the carriage between successive cycles of the glassware forming process is kept to the practicable minimum. The fact that the degree of cushioning is independent of the use of springs which are liable to weakening and mechanical failure when used in a continuous process is an important factor in establishing a reliable high speed glassware forming process.

I claim:

1. A glassware forming apparatus including a mechanism which is movable between first and second positions during the formation of glassware in the apparatus, and a cylinder and piston assembly for moving the mechanism between first and second positions, the cylinder and piston assembly comprising a cylinder having opposed end walls, a piston slidably mounted in the cylinder for reciprocation between the end walls of the cylinder, at least three exhaust openings in each end wall of the cylinder, a plurality of members slidably carried by the piston, each one of said members cooperating with one associated exhaust opening in each of the opposed end walls of the cylinder, there being a greater number of exhaust openings in each end wall than there are slidable members, the slidable members being of different lengths whereby, during reciprocation of the piston, the members are effective to produce a progressive cushioning effect by closure of corresponding exhaust openings when the piston reaches predetermined distances from the end of the piston stroke, each member closing a corresponding opening at a different predetermined distance, the members being slidably repositioned by contact with an end wall of the cylinder at the end of a piston stroke in one direction for effecting a progressive cushioning at the end of the piston stroke in the other direction.

2. The glassware forming apparatus according to claim 1 wherein there is one more exhaust opening than there are slidable members and wherein the exhaust opening which is not closed by a slidable member is the smallest exhaust opening.

3. The glassware forming apparatus according to claim 1 wherein the exhaust openings which are closed by slidable members are of different sizes, the exhaust openings being closed in order of decreasing size.

4. The glassware forming apparatus according to claim 1 further including exhaust ducting leading from each exhaust opening, and variable restrictor means in at least some of said exhaust ducting for varying the rate of flow of exhaust fluid through the respective exhaust openings.

5. The glassware forming apparatus according to claim 1 wherein there are three exhaust openings in each of the opposed end walls and two members slidably carried by the piston.

6. A glassware forming apparatus including a mechanism which is movable between first and second positions during the formation of glassware in the apparatus, and a cylinder and piston assembly for reciprocating said mechanism between said first and second positions, said cylinder and piston assembly comprising a cylinder having opposed end walls, a piston slidably mounted in the cylinder for reciprocation between the opposed end walls, at least two apertures extending through the piston, each having an axis parallel to the axis of said cylinder, a recess at each end of each aperture, a member extending through each aperture, each member comprising a shaft slidably received within its aperture and a pair of enlarged end portions which slide into the recesses at the ends of the aperture to enable the piston to contact the end walls of the cylinder at the extremes of movement in the cylinder, at least one member having a greater length than at least one other member, an opening in each end wall in alignment with each member capable of being substantially closed by one of the enlarged end portions of its corresponding member, and an exhaust outlet in each end wall of the cylinder.

7. The glassware forming apparatus according to claim 6 wherein said openings are of different sizes, the largest opening being associated with the longest member and the smallest opening being associated with the shortest member, and said exhaust outlet is smaller than the smallest opening.

8. The glassware forming apparatus according to claim 6 wherein there are two said members, one of said members being longer than the other, and two openings in each end wall, one opening in each end wall being in alignment with one member and the other being in alignment with the other member.

9. The glassware forming apparatus according to claim 8 wherein each opening associated with the longer member is of larger size than the openings associated with the smaller member.

10. The glassware forming apparatus according to claim 9 wherein said exhaust outlet is smaller than the smaller opening.

11. The glassware forming apparatus according to claim 10 further including exhaust ducting leading from said exhaust outlet, and variable restrictor means in said exhaust ducting for varying the flow of exhaust fluid.

12. The glassware forming apparatus according to claim 11, further including exhaust ducting leading from each of said smaller openings, and variable restrictor means in said exhaust ducting for varying the flow of exhaust fluid.

* * * * *